Nov. 29, 1955     M. P. WINTHER     2,725,133
MAGNETIC POWER TRANSMITTING MECHANISM
Filed Feb. 24, 1951     2 Sheets-Sheet 1
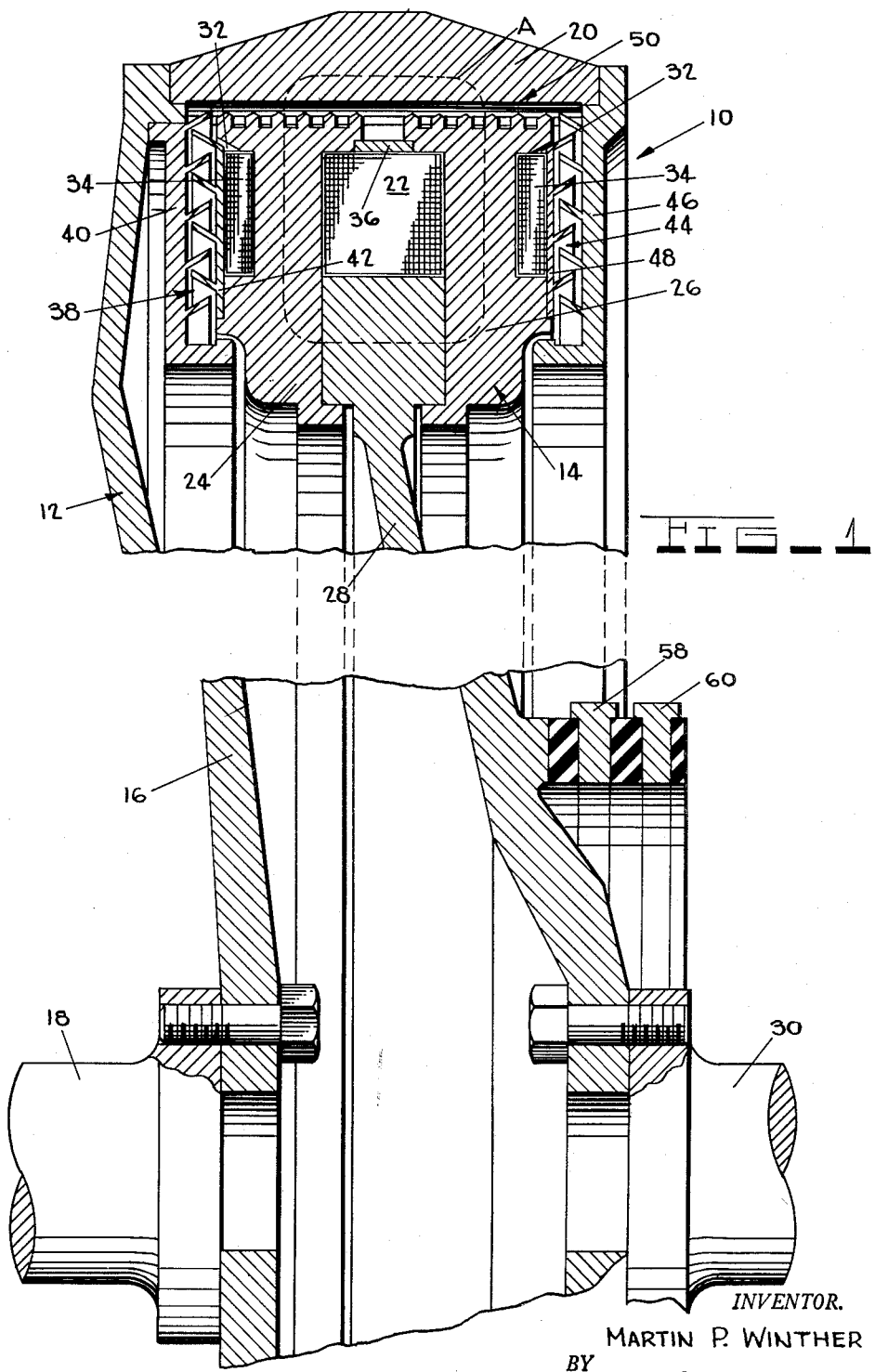
FIG_1
INVENTOR.
MARTIN P. WINTHER
BY
*McDonald & Teagno*
ATTORNEYS Nov. 29, 1955   M. P. WINTHER   2,725,133
MAGNETIC POWER TRANSMITTING MECHANISM
Filed Feb. 24, 1951   2 Sheets-Sheet 2
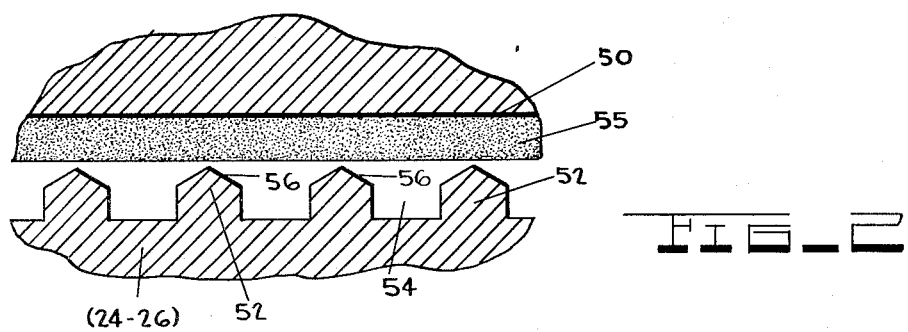
FIG_2
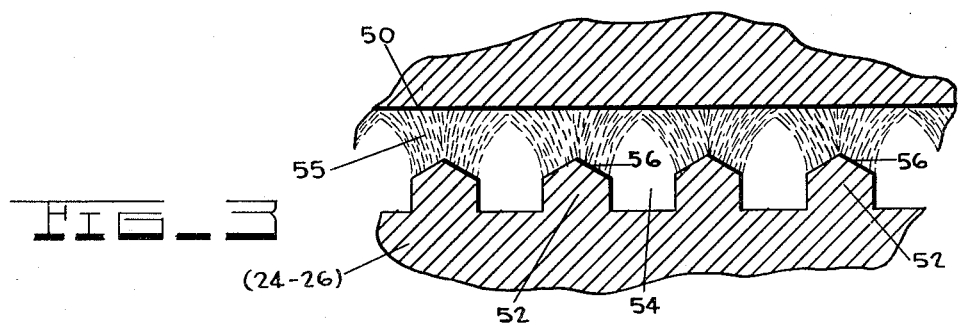
FIG_3
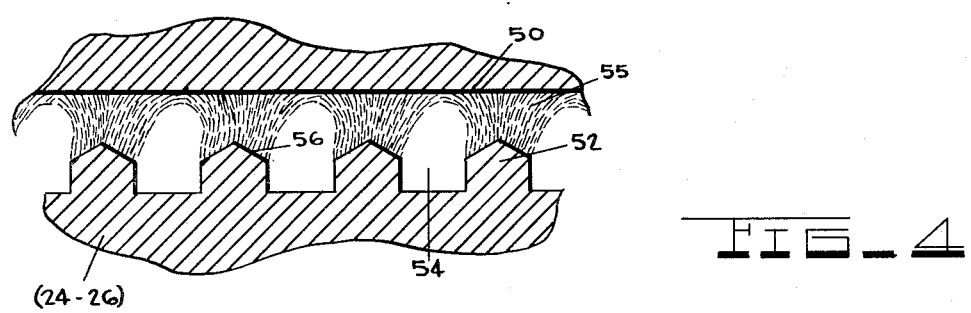
FIG_4
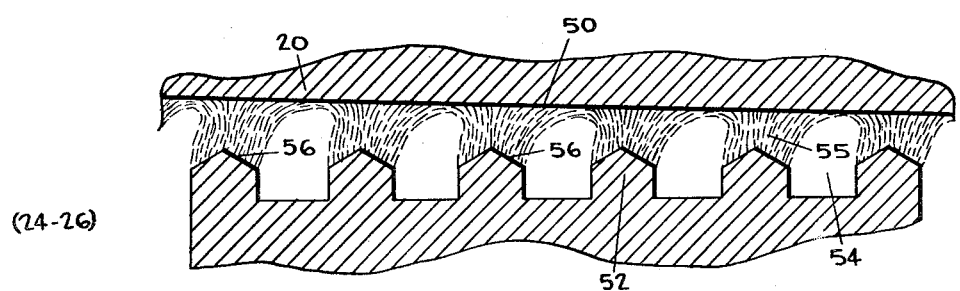
FIG_5
INVENTOR.
MARTIN P. WINTHER
BY
ATTORNEYS

United States Patent Office

2,725,133
Patented Nov. 29, 1955

2,725,133

MAGNETIC POWER TRANSMITTING MECHANISM

Martin P. Winther, Gates Mills, Ohio, assignor, by mesne assignments, to Eaton Manufacturing Company, Cleveland, Ohio, a corporation of Ohio Application February 24, 1951, Serial No. 212,631

23 Claims. (Cl. 192—21.5)

This invention relates to power transmitting mechanism and more particularly to magnetic clutches.

Broadly the invention comprehends the provision of a magnetic clutch of the type employing a magnetic fluid mixture as a power transmitting medium in the space provided between cooperable relatively rotatable driving and driven members thereof and wherein the relatively rotatable members are not held in bearing concentric relation to one another.

Among the principal objects of the invention are to provide a magnetic clutch for marine propulsion or the like employing a magnetic fluid mixture as a power transmitting medium therein, that is capable of effectively transmitting high torque; that does not require bearing concentricity between the driving and driven members thereof; that includes means for preventing excessive packing of the magnetic mixture between the driving and driven members thereof especially when synchronous motion is attained between the driving and driven members; that permits of relative movement as occasioned by angular or lateral misalignment or the like between the driving and driven members thereof without materially affecting the output capacity thereof; that provides means for preventing flux leakage from the desired magnetic flux path established for the clutch which assists in increasing the magnetomotive force of the magnetic clutch up to a value sufficient to cross a large air gap provided between the driving and driven members and that provides for generation of heat in the member from which it can be more suitably and quickly dissipated.

Other objects and advantages of the invention will appear from the following description taken in connection with the drawings forming a part fo the specification; and in which:

Fig. 1 is a fragmentary vertical cross-sectional partly broken away view of a magnetic clutch; and Figs. 2 through 5 illustrate various possible operating positions of the magnetic fluid mixture in the air gap between the driving and driven members of the clutch of Fig. 1.

Similar reference characters indicate corresponding parts throughout the several views of the drawings.

The present magnetic clutch was devised primarily for the purpose of providing a practical clutch for marine propulsion or other uses with large low speed prime movers in which case the cooperating driving and driven members of the clutch will most probably be supported independently of one another.

As a means of assuring high torque capacity for the clutch a suitable magnetic fluid mixture is used in an amount sufficient to form a magnetically held bridge in the air gap between the driving and driven members but insufficient to apply any drag between the members when the clutch is deenergized and solely the driving member thereof is being rotated.

With the driving and driven members being independently supported such that no bearing is provided to cause the members to be held concentric to one another and dependence is had on alignment with the engine crankshaft and the gear box on a structural base, a large air gap is provided. This large air gap accounts for any substantial misalignment of either an angular or lateral nature between the driving and driven members.

Notwithstanding the large gap provided, the magnetic fluid mixture, which is preferably a finely divided dry solid lubricant and finely divided iron powder, such as is more fully defined in Findley Patent No. 2,519,449, is effective upon the production of a sufficiently strong magnetic circuit between the members of the clutch to provide for a high torque transmitting capacity of the clutch.

As a means for insuring against excessive packing of the magnetic mixture in the air gap between the driving and driven members of the clutch which would operate to become jammed therein and prevent release of the clutch once the clutch is deenergized, one of the members is provided with a plurality of peripherally tapered axially spaced annular portions. These tapered portions permit of a considerable amount of misalignment between the cooperable members of the clutch without any appreciable amount of packing of the magnetic mixture occurring therebetween with the result that upon deenergization of the clutch members are immediately released from power transmitting relation with one another.

For the purpose of providing an ample flow of magnetic flux across the large gap between the cooperable members of the clutch a pair of annular coils are disposed in axially spaced relation to one another and a major annular coil for the clutch whereby they operate in a dual capacity of nullifying the shaft magnetizing effect of the major coil and also of concentrating the flux lines in the air gap where required.

Referring to the drawings for more specific details of the invention 10 represents generally a magnetic clutch for use in marine propulsion and the like comprising basically a rotatable driving or drum member 12 and an associated rotatable driven or field magnet member 14.

The driven member 12 includes an end plate 16, bolted or otherwise suitably secured at its inner periphery to an input shaft 18 for the clutch, and an annular ring or drum 20 suitably secured at the outer periphery of the plate 16.

The field magnet member 14 includes an annular magnetic coil 22 having opposite polarity annular pole members 24 and 26 assembled in spaced relation on axial opposite sides thereof and a hub connecting annular member 28 disposed at its outer periphery in coupled arrangement axially between the pole members and radially inwardly of the coil. The member 28 is bolted at its inner periphery to an output shaft 30 for the clutch.

Each of the pole members 24 and 26 has an annular pocket 32 in its outwardly disposed end wall for receipt of a magnetic coil 34, the purpose of which will hereinafter appear.

A non-magnetic annular ring 36 is mounted in radial encompassing relation to the coil 22 in the axial space provided between the outer radial portions of the pole members.

A labyrinth seal arrangement 38 of the interfitting annular collar type is provided intermediate the end plate 16 and pole member 24 and includes an annular member 40 affixed to end plate 16 and a cooperating annular member 42 affixed to the outwardly disposed end wall of the pole member 24 serving to enclose the coil 34 in the pocket 32 thereof.

A labyrinth seal arrangement 44 similar in respect to 38 includes an annular plate member 46 affixed to the drum 20 oppositely disposed to end plate 16 and a cooperative annular member 48 affixed upon the outwardly disposed end wall of pole member 26 enclosing coil 34 in the pocket 32 thereof.

The drum member and field magnet member are supported for relative rotation to one another by independent means whereby no bearing is used to cause the two members of the clutch to be held concentric to one another and dependence is had on alignment with the engine crankshaft or the like and the bear box on a structural base.

Whereas the inner peripheral wall surface 50 of the drum 20 is made reasonably perfectly smooth, the outer peripheries of the pole members provide alternate rings and grooves 52 and 54 respectively.

The rings 52 are each tapered on their outer periphery such that a high point is provided medially of each ring and a uniform taper is provided extending from the grooves to the mid point of each ring, said taper being on the order of 30 degrees to a peripheral surface generated about the axis of the clutch.

A magnetic mixture 55 of suitable composition such as is more fully defined in Findley Patent No. 2,519,449 can be employed in the radial gap provided between the drum and pole members. Accordingly with the use of the magnetic mixture the tapered rings 52 operate as plows 56 to overcome any tendency for packing of the mixture between the smooth surface of the drum and the periphery of the poles upon cooperative rotation therebetween. The plows 56 relieve the packing of the mixture beyond the angle of repose thereof.

Through the provision of coils 34 in the manner disclosed by Fig. 1, a dual effect of nullifying the shaft magnetizing effect of the center coil and also concentrating the flux lines in the air gap where required, is achieved. The coils actually act as shields preventing the leakage of flux and thus concentrating the flux lines in the path A of Fig. 1. Coils 34 are so wound relative to coil 22 so as to provide for the flow of current therein in a direction opposite to the flow of current in coil 22. As such, the flux of coils 34 is additive to the flux of coil 22.

The air gap provided between the drum and pole members is larger than normally employed in conventional magnetic clutches of this sort and accordingly the coils 34 are employed so as to bring the magnetomotive force of the total magnetic circuit up to a value sufficient to cross a large gap.

The coils 34 together have numerically an equal number of ampere turns as coil 22 and are effective in causing flux to cross the air gap and with large air gaps, are almost as effective as center coil 22.

Although not shown, coils 22 and 34 are adapted to be supplied an energizing current, from a source not shown, by way of annular current conducting rings 58 and 60 respectively.

For the purpose of illustrating the relationship of operation between the drum and pole members under varying conditions reference is had to Figs. 2 through 5 wherein at Fig. 2 with the drum as the driver and with the mixture not magnetized the magnetic mixture is thrown centrifugally to the inner wall of the drum with the result that no transmission of power is had between the drum and the pole member. The mixture is of a quantity which will not extend across the gap between the driven and pole members when the clutch is deenergized but of an ample amount to extend across said gap when the clutch is energized as will be explained hereinafter.

Fig. 3 illustrates the condition wherein the magnetic mixture has been magnetized occasioned by the energization of the coils 22 and 34 and with the drum and pole member running true the magnetic mixture assumes a uniform magnetic path between the drum and pole member.

Fig. 4 illustrates a condition between the drum and pole wherein a wobble occurs each side of a true position therebetween such that for the wobble to one side of a true position the magnetized mixture will assume the operating position shown.

Fig. 5 illustrates a wobble occasioned by misalignment between the drum and pole member with a resulting position of the magnetic mixture for one-half revolution of the drum and pole member relative to each other.

It is readily conceivable that if either of the conditions of Fig. 4 or 5 might occur between the drum and pole member that a packing or jamming of the mixture between the drum and pole member would occur upon synchronous motion therebetween if the plows 56 were not effective to prevent packing and thus permit of release between the drum and pole member immediately when the coils are deenergized.

The use of plows 56 thus permit of misalignment either angular or radial between the drum and pole members when synchronous operation is to be attained therebetween without any detriment to or diminution of torque which it may be desired to transmit.

Aside from the plows being effective for the aforesaid purposes, the grooves provided between the rings assume the generation of heat in the drum from where it can be readily dissipated to the surrounding atmosphere. Reference is made to co-pending application Ser. No. 205,479, of Anthony Winther wherein the principle of heat dissipation is more fully explained as regards to the provision of lands of lesser area than the cooperating smooth surface such as is here had between the drum and pole members.

While this invention has been described in connection with certain specific embodiments, the principle involved is susceptible of numerous other applications that will readily occur to persons skilled in the art. The invention, therefore, is limited only as indicated by the scope of the appended claims.

What I claim is:

1. An electromagnetic mechanism comprising cooperative relatively rotatable members, one of which has a smooth annular surface and the other of which has an annular grooved surface providing lands therebetween arranged in radial spaced relation with respect to the smooth surface of the first member, said lands having a tapered profile terminating substantially in a point, means for generating a flux field between the members, and a fluid magnetic material between the respective smooth and grooved surfaces of the members.

2. An electromagnetic mechanism comprising cooperative relatively rotatable members, one of which has a smooth annular surface and the other of which has an annular surface, including axial alternate annular rings and grooves, arranged in radial spaced relation to the smooth surface of the first member, said rings presenting a tapered substantially point terminating profile to the smooth surface of the first member, means for generating a flux field between the members, and a fluid magnetic material in the radial space between the annular surfaces of the respective members.

3. A mechanism according to claim 2 wherein the smooth annular surface is located on the internal peripheral wall of a hollow cylindrical portion of its member and the alternate rings and grooves are located on the external peripheral wall of its member.

4. A mechanism according to claim 2 wherein the means for generating the flux field includes an electromagnetic coil fixedly secured in one of the members.

5. A mechanism according to claim 2 wherein the means for generating the flux field includes an electromagnetic coil mounted axially centrally of one of the members and a pair of coils mounted on said member in axially spaced relation to the other coil on opposite sides thereof with the current flowing in the pair of coils being opopsite to the current flow in the other coil.

6. A mechanism according to claim 2 wherein the tapered profile is in the form of a V with the apex of the V in closest spaced relation to the smooth surface of the other member.

7. A mechanism according to claim 2 wherein the profile of each ring is formed of two surfaces extending from their edge at the grooves and converging together to substantially a point at the midpoint of the ring with the midpoint thereof in closer proximity to the smooth annular surface of the other member than the edges thereof.

8. A mechanism according to claim 3 wherein the member having the smooth annular surface constitutes the driving member.

9. A mechanism according to claim 5 wherein the ampere turns of the pair of coils is substantially numerically equal to the other coil.

10. A mechanism according to claim 5 wherein the coils are mounted on the member having the rings and grooves in its surface.

11. An electromagnetic mechanism comprising cooperative relatively rotatable magnetic members, and means for generating a flux field between the members including a large coil and a pair of smaller coils mounted upon one of the members with the large coil disposed centrally of the member and the other coils mounted in spaced relation to the large coil on opposite sides thereof, said smaller coils having combined amperage turns substantially numerically equal to the large coil, with provision for current flow therein opposite to the current flow in the large coil.

12. An electromagnetic mechanism comprising cooperative relatively rotatable members, and means for generating a flux field between the members including a large coil and a pair of smaller coils mounted upon one of the members with the large coil disposed centrally of the member and the other coils mounted in spaced relation to the large coil on opposite sides thereof with the current flow in the smaller coils being opposite from the current flow in the large coil.

13. A mechanism according to claim 12 wherein an annular air space is provided between the members and wherein a fluid magnetic material is disposed in the air space between the members in the flux field generated therebetween.

14. A mechanism according to claim 12 wherein the one member having the coils as a part thereof includes a pair of opposite polarity pole members with the large coil spaced intermediate said pole members and with one of the pair of coils mounted on the respective pole members.

15. A mechanism according to claim 12 wherein the members have cooperative axially extended annular surfaces spaced apart a predetermined radial amount.

16. A mechanism according to claim 13 wherein the path of flux passes between the large coil and each of the pair of coils.

17. A mechanism according to claim 13 wherein one of the members has a smooth annular surface and the other member has a plurality of annular plows on an annular surface thereof cooperable with the fluid material disposed between said annular surfaces of the cooperative members.

18. A mechanism according to claim 14 wherein one rotatable member has a smooth axially extended annular surface and pole members of the other relatively rotatable member each have a plurality of axially spaced annular plows on the outer periphery wherein a fluid magnetic material is disposed radially between the pole members and the smooth annular surface of the other member, and wherein said plows cooperate with said fluid magnetic mixture.

19. A mechanism according to claim 17 wherein the annular surfaces of the members are spaced radially apart from one another.

20. An electromagnetic mechanism comprising co-operative relatively rotatable members, one of which has a smooth annular surface and the other of which has an annular grooved surface and providing annular surface portions between said grooves, the profile of each annular surface portion being wedge-shaped and converging to substantially a point, means for generating a flux field between the members and a fluid magnetic material between the respective smooth and grooved surfaces of the members.

21. An electromagnetic mechanism comprising co-operative relatively rotatable members, one of which has an annular grooved surface and the other of which has an annular surface arranged in radial-spaced relation with respect to the annular grooved surface and providing annular surface portions between said grooves, the annular surface portions being wedge-shaped and converging to substantially a line annulus in the region of its largest diameter, means for generating a flux field between the members and a fluid magnetic material between the respective annular and grooved surfaces of the members.

22. An electromagnetic mechanism comprising co-operative relatively rotatable members, one of which has a smooth annular surface and the other of which has an annular corrugated surface in radial-spaced relation with respect to the smooth surface of the smooth member, said corrugated surface having alternate grooves and ridges, said ridges converging to a line annulus at their maximum diameter and providing a low reluctance magnetic path between said members, means for generating a magnetic field between the members and fluid magnetic material disposed between the respective smooth and corrugated surfaces of the members.

23. An electromagnetic mechanism comprising co-operative relatively rotatable inner and outer members, said outer member having a smooth annular surface and said inner member having an annular grooved surface providing lands axially spaced between the grooves and being in radial-spaced relation with respect to the smooth surface of the outer member, said lands having a tapered profile and terminating substantially in a point, an electromagnetic coil means fixedly secured in the inner member for generating a flux field between the members, and a fluid magnetic material between the respective smooth and grooved surfaces of the members.

References Cited in the file of this patent

UNITED STATES PATENTS

| 2,411,122 | Winther | Nov. 12, 1946 |
| 2,449,779 | Jaeschke | Sept. 21, 1948 |
| 2,453,957 | Allen | Nov. 16, 1948 |
| 2,525,571 | Winther | Oct. 10, 1950 |
| 2,525,579 | Beatty, Jr. | Oct. 10, 1950 |
| 2,543,394 | Winther | Feb. 27, 1951 |
| 2,605,876 | Becher | Aug. 5, 1952 |

FOREIGN PATENTS

| 976,917 | France | Nov. 1, 1950 |